(12) United States Patent
Komaragiri et al.

(10) Patent No.: US 11,680,791 B2
(45) Date of Patent: Jun. 20, 2023

(54) METHODS AND SYSTEMS FOR REAL-TIME, IN-PROCESS MEASUREMENT OF COATINGS ON SUBSTRATES OF AEROSPACE COMPONENTS

(71) Applicant: Sensory Analytics, LLC, Greensboro, NC (US)

(72) Inventors: Vivek C. Komaragiri, Greensboro, NC (US); Greg Frisby, Greensboro, NC (US)

(73) Assignee: SENSORY ANALYTICS, LLC, Greensboro, NC (US)

( * ) Notice: Subject to any disclaimer, the term of this patent is extended or adjusted under 35 U.S.C. 154(b) by 0 days.

(21) Appl. No.: 17/545,397

(22) Filed: Dec. 8, 2021

(65) Prior Publication Data

US 2022/0099433 A1  Mar. 31, 2022

Related U.S. Application Data

(63) Continuation of application No. 17/217,240, filed on Mar. 30, 2021, now Pat. No. 11,226,192, which is a
(Continued)

(51) Int. Cl.
*G01B 11/06* (2006.01)
(52) U.S. Cl.
CPC .................. *G01B 11/0625* (2013.01)
(58) Field of Classification Search
None
See application file for complete search history.

(56) References Cited

U.S. PATENT DOCUMENTS 5,091,647 A * 2/1992 Carduner ........... G01B 11/0625
250/341.5
6,111,634 A 8/2000 Pecen et al.
(Continued)

FOREIGN PATENT DOCUMENTS

JP 07280520 A 10/1995
JP 2001165628 A 6/2001
(Continued)

OTHER PUBLICATIONS

ISA/KR; International Search Report and Written Opinion for International Patent Application No. PCT/US18/41541 dated Oct. 25, 2018, 10 pages.
(Continued)

*Primary Examiner* — David P Porta
*Assistant Examiner* — Mamadou Faye
(74) *Attorney, Agent, or Firm* — NK Patent Law

(57) ABSTRACT

A method for measuring the thickness of coatings on a substrate of an aerospace component comprises illuminating a sample comprising the substrate of the aerospace component and a coating with light waves of varying wavelengths from a light source, receiving the light waves reflected by the sample at a light collector, diffracting the light waves into a plurality of component wavelengths with a grating, detecting the light intensities of the plurality of component wavelengths at a detector array, generating a reflectance spectral curve using the detected light intensities for each of the plurality of component wavelengths, calculating the thickness of the coating from the reflectance spectral curves of the component wavelengths.

20 Claims, 5 Drawing Sheets

Related U.S. Application Data continuation of application No. 17/165,844, filed on Feb. 2, 2021, now Pat. No. 11,143,501, which is a continuation of application No. 16/740,990, filed on Jan. 13, 2020, now Pat. No. 10,928,185, which is a continuation of application No. PCT/US2018/041541, filed on Jul. 11, 2018.

(60) Provisional application No. 62/531,484, filed on Jul. 12, 2017.

(56) References Cited

U.S. PATENT DOCUMENTS

| | | | |
|---|---|---|---|
| 6,876,392 | B1 | 4/2005 | Uomori et al. |
| 7,304,744 | B1 | 12/2007 | Hatanaka et al. |
| 7,365,860 | B2 | 4/2008 | Price |
| 10,928,185 | B2 | 2/2021 | Komaragiri et al. |
| 11,143,500 | B2 | 10/2021 | Komaragiri et al. |
| 11,143,501 | B2 * | 10/2021 | Komaragiri ............ G01N 21/95 |
| 2001/0046054 | A1 * | 11/2001 | Zeylikovich ....... G01B 9/02007 356/497 |
| 2002/0119259 | A1 * | 8/2002 | Kamei .................. B05D 5/068 427/407.1 |
| 2002/0168551 | A1 | 11/2002 | Emmonds et al. |
| 2005/0208303 | A1 * | 9/2005 | Atarashi ............... C09C 1/0024 428/403 |
| 2011/0292406 | A1 | 12/2011 | Hollenbeck et al. |
| 2013/0211766 | A1 * | 8/2013 | Rosenberg ............. G01S 15/06 702/97 |
| 2015/0316415 | A1 * | 11/2015 | Islam ................... A61B 5/7257 250/338.4 |
| 2015/0331414 | A1 | 11/2015 | Davis |

FOREIGN PATENT DOCUMENTS

| | | |
|---|---|---|
| JP | 2002081910 A | 3/2002 |
| JP | 2009139360 A | 6/2009 |

OTHER PUBLICATIONS

WIPO; International Preliminary Report on Patentability for International Patent Application No. PCT/US2018/041541 dated Jan. 23, 2020, 9 pages.

USPTO; Non-Final Office Action for U.S. Appl. No. 16/740,990 dated Aug. 13, 2020, 8 pages.

EPO, Extended European Search Report in European Application No. 18831626.9-1010 dated Mar. 17, 2021.

USPTO; Non-Final Office Action for U.S. Appl. No. 17/151,402 dated Aug. 5, 2021, 32 pages.

USPTO; Non-Final Office Action for U.S. Appl. No. 17/165,844 dated Aug. 5, 2021, 36 pages.

EPO; Communication pursuant to Article 94(3) EPC to European Patent Application No. 18831626.9 dated Apr. 5, 2023, 4 pages.

* cited by examiner

METHODS AND SYSTEMS FOR REAL-TIME, IN-PROCESS MEASUREMENT OF COATINGS ON SUBSTRATES OF AEROSPACE COMPONENTS

CROSS-REFERENCE TO RELATED APPLICATIONS

This application is a continuation of U.S. patent Non-Provisional application Ser. No. 17/217,240 entitled "METHODS AND SYSTEMS FOR REAL-TIME, IN-PROCESS MEASUREMENT OF COATINGS ON SUBSTRATES OF AEROSPACE COMPONENTS" filed on Mar. 30, 2021, which is a continuation of U.S. Non-Provisional patent application Ser. No. 17/165,844 entitled "METHODS AND SYSTEMS FOR REAL-TIME, IN-PROCESS MEASUREMENT OF POWDER COATINGS ON METAL SUBSTRATES OF APPLIANCES" filed on Feb. 2, 2021, now U.S. Pat. No. 11,143,501, which is a continuation of U.S. Non-Provisional patent application Ser. No. 16/740,990 entitled "METHODS AND SYSTEMS FOR REAL-TIME, IN-PROCESS MEASUREMENT OF COATINGS ON METAL SUBSTRATES USING OPTICAL SYSTEMS" filed on Jan. 13, 2020, now U.S. Pat. No. 10,928,185, which is a continuation of International Patent Application No. PCT/US18/41541 entitled "METHODS AND SYSTEMS FOR REAL-TIME, IN-PROCESS MEASUREMENT OF COATINGS ON METAL SUBSTRATES USING OPTICAL SYSTEMS" filed on Jul. 11, 2018, which claims priority to and benefit of U.S. Provisional Patent Application No. 62/531,484 entitled "Methods and Systems for Real-Time, In-Process Measurement of Coatings on Metal Substrates Using Optical Systems" filed Jul. 12, 2017, the entire contents of which are all hereby incorporated herein by reference.

BACKGROUND OF THE DISCLOSURE

The present disclosure generally relates to methods and systems for measuring the thickness of clear and pigmented coatings applied on various metal substrates, more specifically tailored to the products in the coil coating industry. Embodiments include methods and systems for real-time, in-process measurement of applied primer and/or top coat coating thickness, and more particularly methods and systems for real-time, in-process measurement of coating thickness of a combination of one or more layers on a static or a moving substrate.

In coil coating industry, most products are made by application of one or two or more layers of pigmented coatings applied on both sides of a metal coil. These coated products can be used in a wide range of industries such as construction, automobile, aerospace, appliances and so on. The coating is applied on a metal substrate at a relatively high speed of about 500 to 1000 feet per minute. Several alternative techniques exist to measure the thickness of the coating in an offline inspection, but there are no non-contact or non-destructive, non-radioactive methods for measuring paint thickness in real-time on the moving metal substrate during the coating process. The current widely used technique for measuring thickness, and thereby controlling quality, is an offline destructive inspection method measuring the coating thickness of approximately an area of 1 mm$^2$ on a coil that has an area of several thousand square meters. In this method, the thickness of the coating on the remainder of the coil is simply assumed to be similar or identical to the measured sample area. The current methods are time-consuming and provide very little meaningful data for quality and process control improvements. Other alternate methods include slow and tedious paint weight measurements based on stripping the coating over a chosen surface area with the difference of weights before and after the coating is removed providing the weight of the coating over an area.

The coil coating process generally involves multiple layers of coating starting from a pretreatment followed by a primer and top coating. It is important to continuously monitor the applied coating accurately as any under-application of coating generally results in poor product performance and the costs of repairing or replacing under-applied coated coils are substantial. There are currently no reliable tools to accurately measure the thickness of these coatings in real-time directly on the metal coil itself during the coating process. The primer and top coat layers are usually pigmented and most optical tools are limited to measuring transparent or mildly pigmented coatings and even that is limited to offline measurements in most cases. The only alternate methods for measuring the coating thickness in real-time involve indirect measurements of the paint on the coating applicator rather than direct measurements of the coated coil itself. At best, the indirect measurements of the coating applicator are approximations of the coatings that may eventually be transferred to the metal coil. Moreover, although there are several optical measurement tools and techniques that can measure thickness of transparent or semi-transparent layers, there are no existing tools or technologies that can directly measure the thickness of a heavily pigmented layers (with a pigmentation level of 40% or more) on metal coils of any variety for up to 75 microns.

Thus, there remains a need for methods and systems for direct optical measurement of pigmented coatings on static or moving metal coils in real-time.

SUMMARY OF THE INVENTION

The present invention relates to measuring and monitoring accurate coating thickness of heavily pigmented coatings on metal substrates such as aluminum and steel with pretreatment using the reflectance spectra which is obtained using broad spectral range optical system with array detector when the coating thickness is between 1 and 75 microns. The measured thickness could be a single layer of pigmented coating, multiple pigmented coatings or a combination of transparent and pigmented coatings on metals. The present invention relates to specifically measuring the primer and top coat thickness in real time at production line speeds on one or both sides of the coil simultaneously.

In one embodiment of the present invention, a method for measuring the thickness of coatings on metal substrates may include illuminating a sample comprising a substrate and a coating with light waves of varying wavelengths from a light source. The method may further include receiving the light waves reflected by the sample at a light collector. The method may further include diffracting the light waves into a plurality of component wavelengths with a grating. The method may further include detecting the light intensities of the plurality of component wavelengths at a detector array. The method may further include generating a reflectance spectral curve using the light intensities for each of the plurality of component wavelengths. The method may further include calculating the thickness of the coating from the reflectance spectral curves of the component wavelengths.

In another embodiment of the present invention, a system for measuring the thickness of coatings on metal substrates may include a processor and a light source in communication with the processor, the light source configured to illuminate a sample comprising a substrate and a coating with light waves of varying wavelengths. The system may further include a detection module in communication with the processor. The detection module may include a light collector configured to receive light waves reflected by the sample, a grating configured to diffract the light waves into a plurality of component wavelengths, and a detector array configured to detect the light intensities of the plurality of component wavelengths. The system may further include a memory in communication with the processor, wherein the memory comprises computer program code executable by the processor. The computer program code may be configured to generate a reflectance spectral curve using the detected light intensities for each of the plurality of component wavelengths, calculate the thickness of the coating from the reflectance spectral curves of the component wavelengths, and display the calculated thickness of the coating in real-time.

In yet another embodiment, the sample may be continuously moving.

In yet another embodiment, the light waves of varying wavelengths may be between about 1000 nm and about 2500 nm.

In yet another embodiment, the light source may be part of a bifurcated fiber optic cable.

In yet another embodiment, the light collector may be part of a bifurcated fiber optic cable.

In yet another embodiment, the grating may match the spectral response over a specific wavelength range suitable for the sample.

In yet another embodiment, the frequency of the reflectance spectral curve may be directly proportional to the thickness of the coating.

In yet another embodiment, calculating the thickness of the coating may occur in real-time.

In yet another embodiment, a sensor may be configured to detect changes in the distance between the sample and the light source.

In yet another embodiment, illuminating the sample may include varying the intensity of the light waves based on the distance between the sample and the light source.

In yet another embodiment, a coating applicator in communication with the processor may be configured to receive the calculated thickness of the coating and adjust the amount of coating applied to the substrate in real-time.

BRIEF DESCRIPTION OF THE DRAWINGS

These and other objects, features, and characteristics will become more apparent to those skilled in the art from a study of the following Detailed Description in conjunction with the appended claims and drawings, all of which form a part of this specification. While the accompanying drawings include illustrations of various embodiments, the drawings are not intended to limit the claimed subject matter.

DETAILED DESCRIPTION

The presently disclosed subject matter is presented with sufficient details to provide an understanding of one or more particular embodiments of broader inventive subject matters. The descriptions expound upon and exemplify particular features of those particular embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example reference to "a light source" can include a plurality of such light sources, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments, +/−10%, in some embodiments +/−5%, in some embodiments +/−1%, in some embodiments +/−0.5%, and in some embodiments, +/−0.1%, from the specified amount, as such variations are appropriate in the disclosed products and methods.

Figure 1:
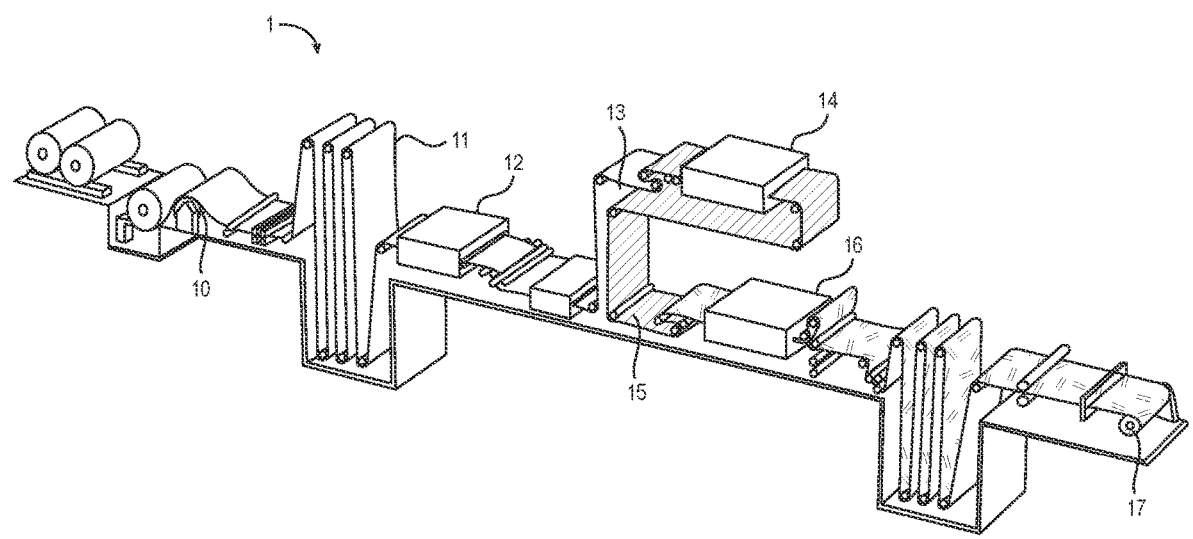
FIG. 1 is a diagram of a prior art coil coating line.

Referring now to FIG. 1, a prior art coil coating line 1 is shown. A typical coil coating line 1 may consist of an entrance accumulator 11 that provides a reservoir of uncoiled metal substrate received from uncoiler 10. The entrance accumulator 11 may be followed by pretreatment from a cleaning and conversion coating apparatus 12 followed by the application of primer coatings from a prime coater 13 on both sides of the coil. The primer coating is cured in the curing oven 14 before a top coat (or finish coat) is applied by the top coater 15 on top of the primer on both sides of the metal coil. The metal substrate with the coating may then be finished in the finish oven 16 and recoiled by the recoiler 17. All aspects of the coil coating line 1, including the speed of the coil substrate and the amount of coating applied, may typically be controlled with a computer (not shown).

According to some embodiments of the present invention, the systems and methods of the present invention may be in communication with the computer controlling the coil coating line, the computer configured to receive the calculated thickness of the coating and adjust the amount of coating applied to the substrate in real-time. Because the response time of the measurement of the in-process measurement system in the present invention is in milliseconds, there may be a realtime feedback on the thickness of the applied coating. Due to the realtime feedback, the application of the coating can be controlled by the coating machine so that the coating is not only uniform across the width of the coil, but also is not overapplied, resulting in significant amount of coating savings when considering production on an industrial scale. On the other hand, the present invention may also help eliminate underapplication of coating which results in significant savings for coil coating manufacturers in reducing scrap and avoiding expensive quality claims.

Figure 2:
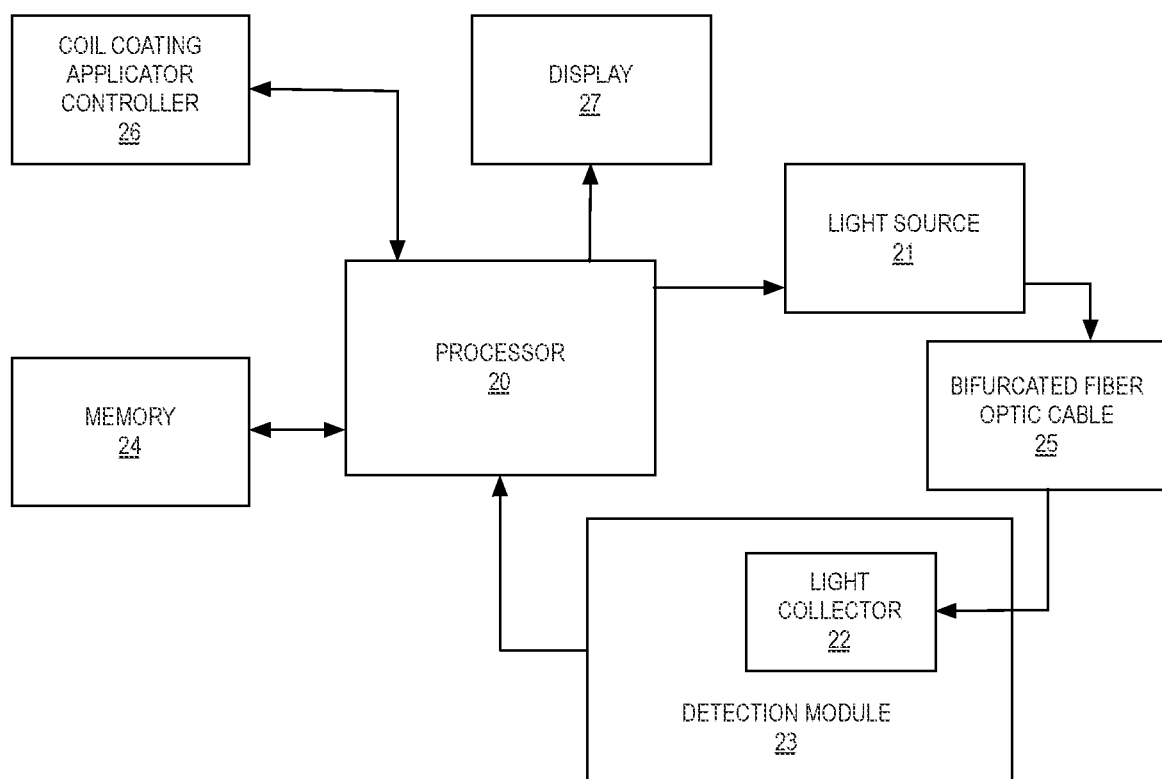
FIG. 2 is a block diagram of a system for measuring the thickness of coatings on metal substrates according to an embodiment of the present invention.

Referring now to FIG. 2, a system for measuring the thickness of coatings on metal substrates according to one embodiment of the present invention is shown. The system may include a processor 20 and a light source 21 in communication with the processor 20, the light source 21 configured to illuminate a sample comprising a substrate and a coating with light waves of varying wavelengths. The system may include a detection module 23 in communication with the processor 20 comprising: a light collector 22 configured to receive light waves reflected by the sample, a grating configured to diffract the light waves into a plurality of component wavelengths, and a detector array configured to detect the light intensities of each of the plurality of component wavelengths. The system may further include a memory 24 in communication with the processor 20, wherein the memory 24 comprises computer program code executable by the processor 20. The computer program code may be configured to: generate a reflectance spectral curve using the detected light intensities for each of the plurality of component wavelengths, calculate the thickness of the coating from the reflectance spectral curves of the component wavelengths, and display the calculated thickness of the coating in real-time.

The processor 20 may receive input signals from and generate instruction signals for the coil coating applicator controller 26 to process sensor readings to measure or adjust thickness of coatings in real-time. The processor 20 may also communicate this data to a display 27, allowing operators to observe the data in real-time. The processor 20 may include or may be in communication with one or more computer-readable media, such as a memory 24. The processor 20 may further execute computer-executable program instructions stored in memory 24. The processor 20 may comprise a microprocessor, a digital signal processor (DSP), an application-specific integrated circuit (ASIC), one or more field programmable gate arrays (FPGAs), or state machines. The processor 20 may further comprise a programmable electronic device such as a PLC, a programmable interrupt controller (PIC), a programmable logic device (PLD), a programmable read-only memory (PROM), an electronically programmable read-only memory (EPROM or EEPROM), or other similar device.

The memory 24 may comprise a computer-readable media that may store instructions, which, when executed by the processor 20, cause it to perform various steps, such as those described herein. Embodiments of computer-readable media may comprise, but are not limited to, and electronic, optical magnetic, or other storage or transmission device capable of providing the processor 20 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device.

Figure 5:
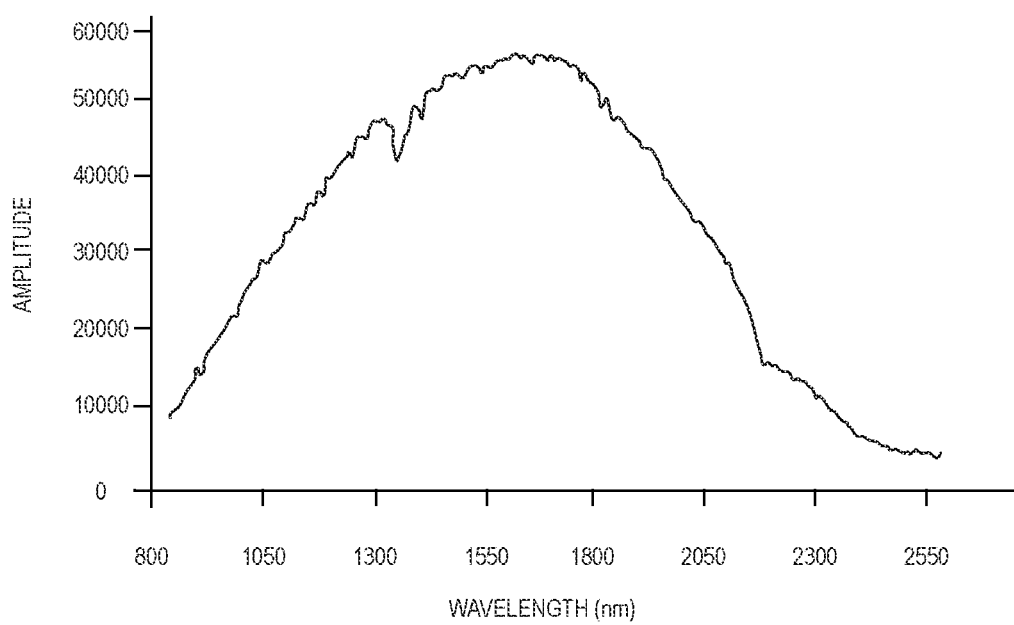
FIG. 5 is a graph of the spectral response of a light source according to an embodiment of the present invention.

According to some embodiments, a bifurcated fiber optic cable 25 may be used for transmitting the light from the light source and also to detect the light coming back from the light sample. The light source leg of the bifurcated fiber optic cable 25 may consist of 6 illuminating fibers and the second leg of the bifurcated fiber optic cable 25 may consist of one detecting fiber. In preferred embodiments, light waves may be provided by a tungsten halogen broadband light source or other suitable broadband light source with adequate energy response in the wavelength range of operation and the spectral response shown in FIG. 5.

Figure 3:
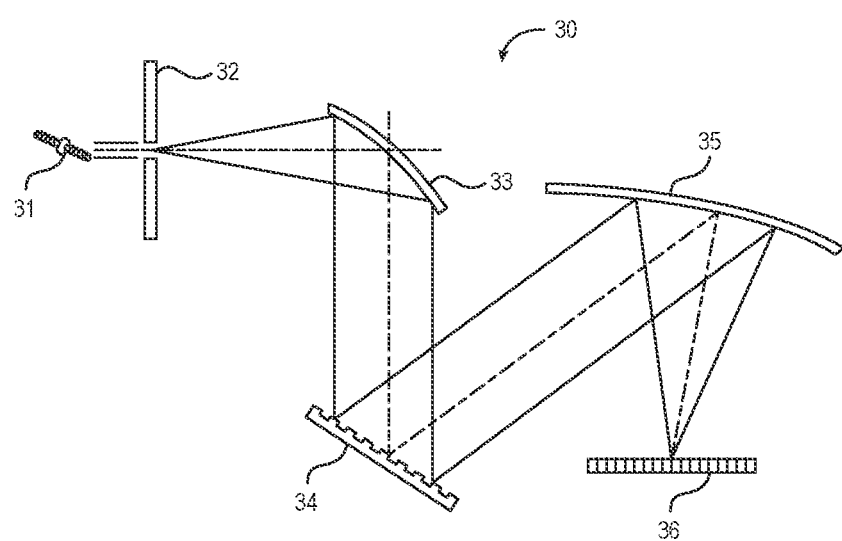
FIG. 3 is a diagram of a detection module according to an embodiment of the present invention.

Referring now to FIG. 3, a detection module 30 according to an embodiment of the present invention is shown. The detection module 30 may be comprised of several optical components. The detection leg of the fiber optic cable may be attached to an SMA connector 31, followed by a fixed entrance slit 32 (which determines the optical resolution of the detector configuration). The light that passes through the fixed entrance slit 32 may be illuminated on a collimating mirror 33 and reflect from the collimating mirror 33 as a collimated beam towards the grating 34.

According to some embodiments of the present invention, the grating 34 may match the spectral response over a specific wavelength range suitable for the sample. The grating 34 may a dispersive optical component which splits and diffracts light into different wavelength components. The grating 34 may be carefully chosen to match the spectral response over a specific wavelength range that is suitable for different chemical compositions and paint colors used for coil coating industry according to method known in the art. The different light beams from the grating 34 may then be directed to a focusing mirror 35 and the focusing mirror 35 may focus the first order spectra on the detector array 36. The detector array 36 may have at least 256 elements collecting the reflectance data at 256 discrete wavelengths.

Figure 4:
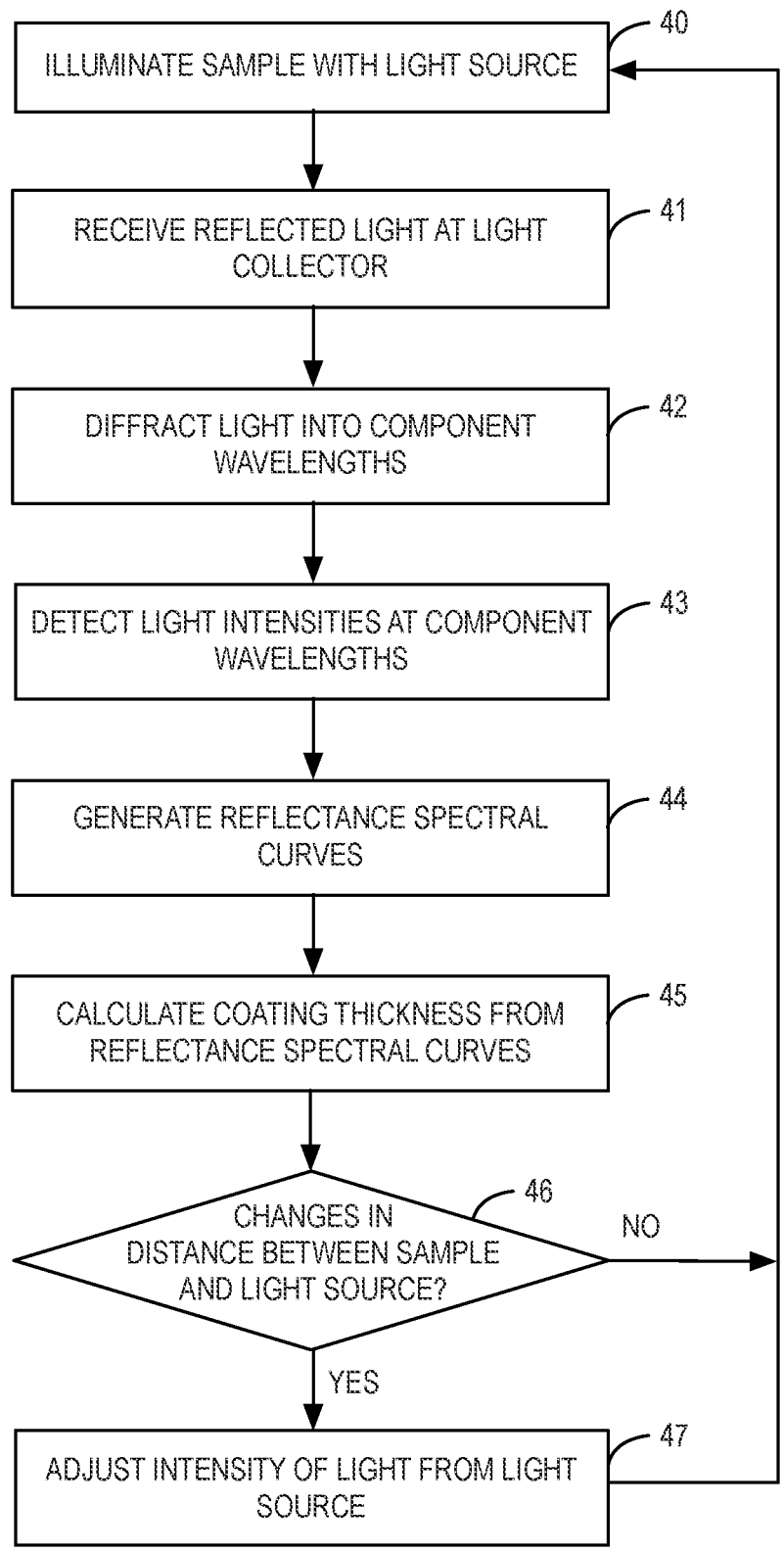
FIG. 4 is a flow chart diagram of a method for measuring the thickness of coatings on metal substrates according to an embodiment of the present invention.

Referring now to FIG. 4, a method for measuring the thickness of coatings on metal substrates according to one embodiment of the present invention is shown. The method may include at step 40 illuminating a sample comprising a substrate and a coating with light waves of varying wavelengths from a light source. The method may further include at step 41 receiving the light waves reflected by the sample at a light collector. The method may further include at step 42 diffracting the light waves into a plurality of component wavelengths with a grating. The method may further include at step 43 detecting the light intensities of the plurality of component wavelengths at a detector array. The method may further include at step 44 generating a reflectance spectral curve using detected light intensities for each of the plurality of component wavelengths. The method may further include at step 45 calculating the thickness of the coating from the reflectance spectral curves of the component wavelengths.

According to some embodiments of the present invention, the sample may be continuously moving. In such embodiments, measuring the coating thickness in real-time may require consideration of web flutter in the sample metal coil. As the metal coil is coated at high speeds, there may be a certain amount of web flutter (up and down motion across the width of the coil). This poses a significant challenge for most optical tools because traditional optical tools use actual values of reflectance to calculate the thickness of the coating and the up and down motion of the coil will have such a significant impact on the actual reflectance value that it makes the measurements highly unreliable in-process.

According to some embodiments of the present invention, the method may further include at step 46 detecting changes in the distance between the sample and the light source. When either the sample moves too close to the fiber optic light collector or when the sample goes too far from the fiber optic light collector, the detected light intensities will be beyond an acceptable range. When such light intensities are detected, the systems according to the present invention can compensate for the change in distance as described further herein. The system may be calibrated to predefine acceptable ranges of light intensities.

According to some embodiments of the present invention, illuminating the sample may include at step 47 varying the intensity of the light waves based on the distance between the sample and the light source. By controlling the intensity of the light in real-time, the effects of web flutter can be mitigated. If the sample moves closer to the sensor then the intensity of the incident light may be reduced, and similarly, if the sample moves farther away from the sensor, the intensity of the incident light may be increased. After calculating the thickness of the coating, if it is determined that the distance between the sample and the light source has changed due to web flutter, the intensity of the light may be changed before the next measurement is taken.

According to some embodiments of the present invention, the light waves of varying wavelengths may be between about 1000 nm and about 2500 nm. In preferred embodiments, light waves in this wavelength range may be provided by a tungsten halogen broadband light source or other suitable light source with adequate energy response in the wavelength range of operation and the spectral response shown in FIG. 5.

A portion of the light waves that are illuminated on the coated sample reflect from the top of the coating and a portion of the light waves passes through the coating and reflect from the bottom of the top of the substrate. The reflectance values may be collected on all the discrete wavelengths in a time span of approximately 50 milliseconds or less. The two reflected light waves may be mathematically superimposed to generate a resultant reflectance spectral curve. The spectral curve will take the shape of a periodic waveform. The frequency of the resulting periodic wave may be directly proportional to the thickness of the measured coating. The resultant spectral curve will have p- and s-polarized components of reflectance that generally satisfy the following equations:

$$R_p = \left| \frac{n_1 \cos\theta_t - n_2 \cos\theta_i}{n_1 \cos\theta_t + n_2 \cos\theta_i} \right|^2 = \left| \frac{n_1 \sqrt{1 - \left(\frac{n_1}{n_2}\sin\theta_i\right)^2} - n_2 \cos\theta_i}{n_1 \sqrt{1 - \left(\frac{n_1}{n_2}\sin\theta_i\right)^2} + n_2 \cos\theta_i} \right|^2.$$

$$R_s = \left| \frac{n_1 \cos\theta_i - n_2 \cos\theta_t}{n_1 \cos\theta_i + n_2 \cos\theta_t} \right|^2 = \left| \frac{n_1 \cos\theta_i - n_2 \sqrt{1 - \left(\frac{n_1}{n_2}\sin\theta_i\right)^2}}{n_1 \cos\theta_i + n_2 \sqrt{1 - \left(\frac{n_1}{n_2}\sin\theta_i\right)^2}} \right|^2,$$

In the above equations, $n_1$=complex refractive index of the coating, $n_2$=complex refractive index of the substrate, $\theta_i$=angel of incidence, $\theta_t$=transmission angle, $R_p$=p-polarized reflectance component, and $R_s$=s-polarized reflectance component. The p and s polarized reflectance components are a function of wavelength and have a reflectance value at each wavelength.

According to some embodiments of the present invention, the frequency of the reflectance spectral curve may be directly proportional to the thickness of the coating.

According to some embodiments of the present invention, calculating the thickness of the coating may occur in real-time. One of ordinary skill in the art will appreciate that the term "real-time" refers to the ability to perform measurements and calculate thickness from said measurements with minimal delay—on the order of 100 milliseconds or less.

Illustrative System 1

Since the primer and the top coat are applied sequentially at two different stages on both sides of the coil, a complete overall real-time measurement system may consist of the following combination of individual inline systems: an in-process measurement system measuring the front side of the coil where primer is applied, an in-process measurement system for measuring back side of the coil where the primer is applied, a third system for measuring the total thickness of the primer and top coat on the front side of the coil where the top coat is applied on top of already applied primer, an in-process system for measuring the total thickness of the primer and the finish coat on the back side of the coil where the back coat is applied on top of already applied primer.

The measurement systems on the front side of the primer and the top coat may be linked and communicate with each other, and the thickness of the top coat can be obtained by dynamically subtracting total thickness of the front side of the coil and the primer thickness of the front side of the coil.

The measurement systems on the back side of the primer and the back side of the finish stage may be linked and communicate with each other, and the thickness of the back coat can be obtained by dynamically subtracting total thickness on the back side of the coil and the primer thickness on the back side of the coil.

Illustrative System 2

The present invention performs equally well for measuring wet coatings in-process with slight modification. Some manufacturers may prefer measurement of wet coating compared to a dry coating to get feedback on the amount of applied coating and coating consistency earlier in the process before going through the finish oven. The following components may be included in a multi-stage wet measurement system: an in-process measurement system measuring the wet coating before it goes into the oven on front side of the coil where primer is applied, an in-process system for measuring wet coating before it goes into the oven on the back side of the coil where the primer is applied, an in-process system for measuring the total thickness of the primer and wet top coat on the front side of the coil where the top coat is applied on top of already applied primer, an in-process system for measuring the total thickness of the dry primer and the wet finish coat on the back side of the coil where the back coat is applied on top of already applied primer.

The dry thickness of the primer may be calculated from the wet thickness of the primer on both sides of the coil based on the percentage of solids by volume in the primer provided by the primer manufacturer.

The measurement systems on the front side of the primer and the top coat may be linked and communicate with each other, and the thickness of the top coat can be obtained by dynamically subtracting the calculated dry primer from the total thickness of the wet top coat and dry primer. Similarly, dry top coat thickness may be calculated from the wet thickness of the top coat based on the percentage of solids by volume in the top coat provided by the top coat manufacturer.

The measurement systems on the back side of the primer and the back coat may be linked and communicate with each other, and the thickness of the back coat can be obtained by dynamically subtracting the calculated dry primer from the total thickness of the wet back coat and dry primer. Similarly, dry back coat thickness may be calculated from the wet thickness of the back coat based on the percentage of solids by volume in the back coat provided by the back coat manufacturer.

Those skilled in the art will recognize improvements and modifications to the embodiments of the present disclosure. All such improvements and modifications are considered within the scope of the concepts disclosed herein and the claims that follow.

The invention claimed is:

1. A method for measuring a thickness of a coating comprising:
    illuminating a substrate and at least one coating with light waves of varying wavelengths between 1000 nm and 2500 nm from a light source;
    receiving the light waves reflected by a top surface of the coating on the substrate at a light collector;
    receiving the light waves reflected by a bottom surface of the coating on the substrate at the light collector;
    diffracting the light waves into a plurality of component wavelengths with a grating that matches the spectral response over a specific wavelength range suitable for the at least one coating;
    detecting light intensities of the plurality of component wavelengths at a detector array; and
    calculating a thickness of the at least one coating from the detected light intensities.

2. The method of claim 1, wherein the substrate comprises aluminum.

3. The method of claim 1, wherein the substrate forms part of an aerospace component.

4. The method of claim 1, wherein the at least one coating comprises a wet coating applied on top of a dry coating, wherein the method further comprises calculating the thickness of the wet coating and the dry coating.

5. The method of claim 1, wherein the light source forms part of a system, wherein the system further comprises a sensor, wherein the substrate is moving.

6. The method of claim 1, wherein the substrate is continuously moving.

7. The method of claim 1, wherein the light source and light collector are part of an optical system having a bifurcated fiber optic cable, wherein the light source comprises six illuminating fibers of the bifurcated fiber optic cable and the light collector comprises a detecting fiber of the bifurcated fiber optic cable.

8. The method of claim 1, wherein the light source is spaced apart from the light collector.

9. The method of claim 1, wherein the light source is tungsten halogen broadband light source.

10. The method of claim 1, wherein the method further comprises curing the at least one coating.

11. The method of claim 10, wherein the curing the at least one coating occurs prior to calculating the thickness of the at least one coating.

12. The method of claim 10, wherein the curing the at least one coating occurs after calculating the thickness of the at least one coating.

13. The method of claim 10, wherein curing the at least one coating comprises heating the substrate in a curing oven and heating the substrate in a finish oven after heating in the curing oven.

14. A system for measuring a thickness of a coating, the system comprising:
    a processor;
    a broadband light source in communication with the processor, the light source configured to illuminate a substrate and a coating with light waves of varying wavelengths between 1000 nm and 2500 nm;
    a detection module in communication with the processor comprising:
        a light collector configured to receive light waves reflected by the substrate;
        a grating configured to diffract the light waves into a plurality of component wavelengths, wherein the grating matches the spectral response over a specific wavelength range suitable for the at least one coating;
        a detector array configured to detect light intensities of each of the plurality of component wavelengths; and
    a memory in communication with the processor, wherein the memory comprises computer program code executable by the processor configured to:
        calculate a thickness of the coating from the detected light intensities; and
        display the calculated thickness of the coating in real-time.

15. The system of claim 14, wherein the substrate forms part of an aerospace component.

16. The system of claim 14, wherein the substrate comprises aluminum.

17. The system of claim 14, further comprising a sensor, wherein the substrate is configured to move.

18. The system of claim 14, further comprising a sensor, wherein the substrate is continuously moving.

19. The system of claim 14, wherein the light source is spaced apart from the detection module.

20. The system of claim 14, wherein the light source and light collector are part of an optical system comprising a bifurcated fiber optic cable, wherein the light source comprises six illuminating fibers of the bifurcated fiber optic cable and the light collector comprises a detecting fiber of the bifurcated fiber optic cable.

* * * * *